Aug. 8, 1933.   O. J. HORGER   1,921,882
RAILWAY CAR TRUCK AND JOURNAL BOX
Filed Jan. 21, 1931   3 Sheets-Sheet 1
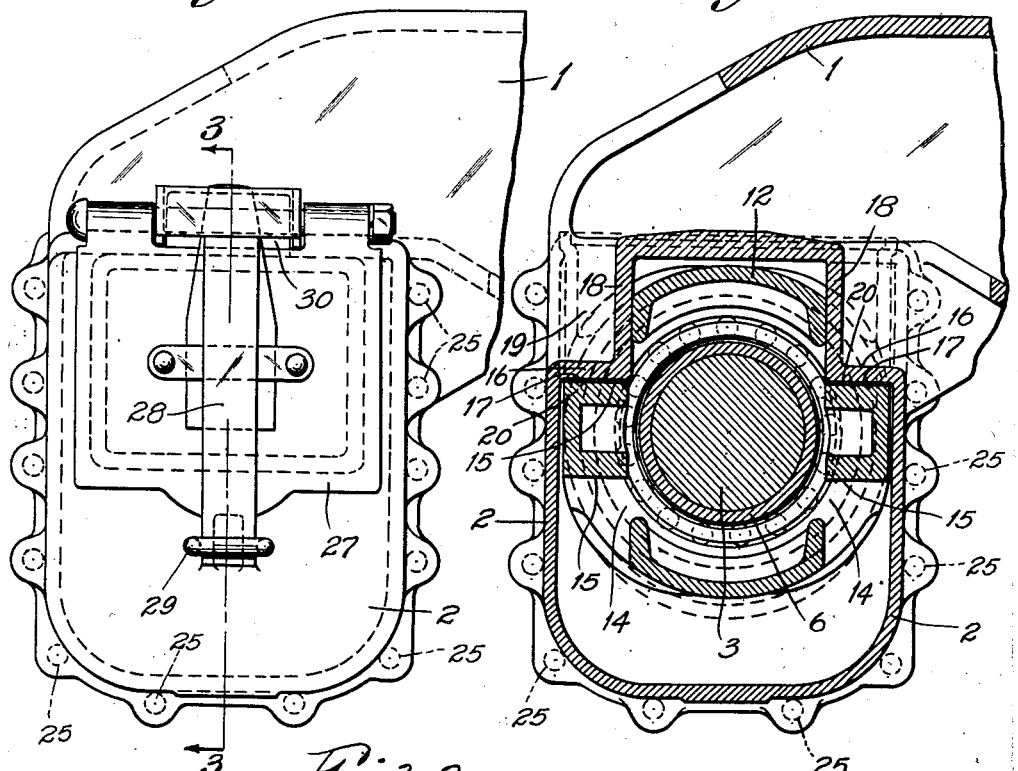
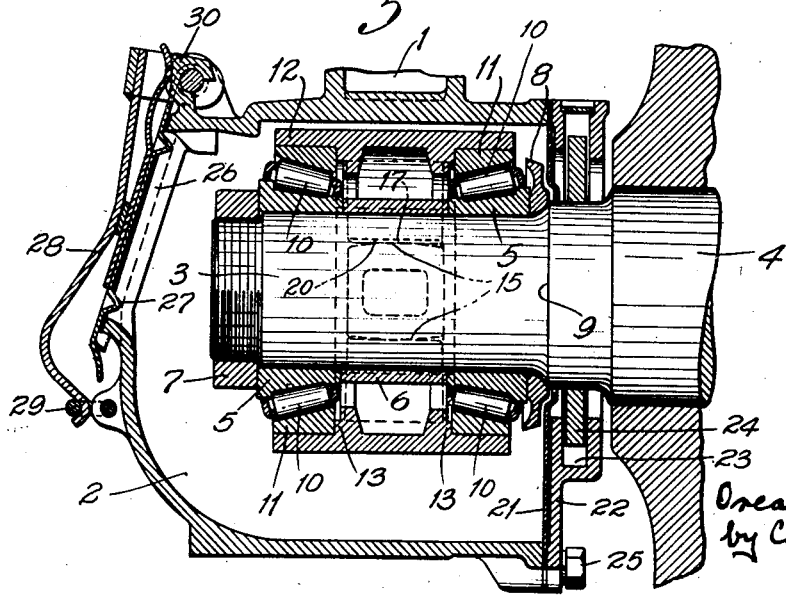
INVENTOR
Oscar J Horger,
by Carr Kerr & Grandy
HIS ATTORNEYS Aug. 8, 1933.   O. J. HORGER   1,921,882
RAILWAY CAR TRUCK AND JOURNAL BOX
Filed Jan. 21, 1931   3 Sheets-Sheet 2

INVENTOR
Oscar J. Horger,
by Carr Kent Gravely,
HIS ATTORNEYS

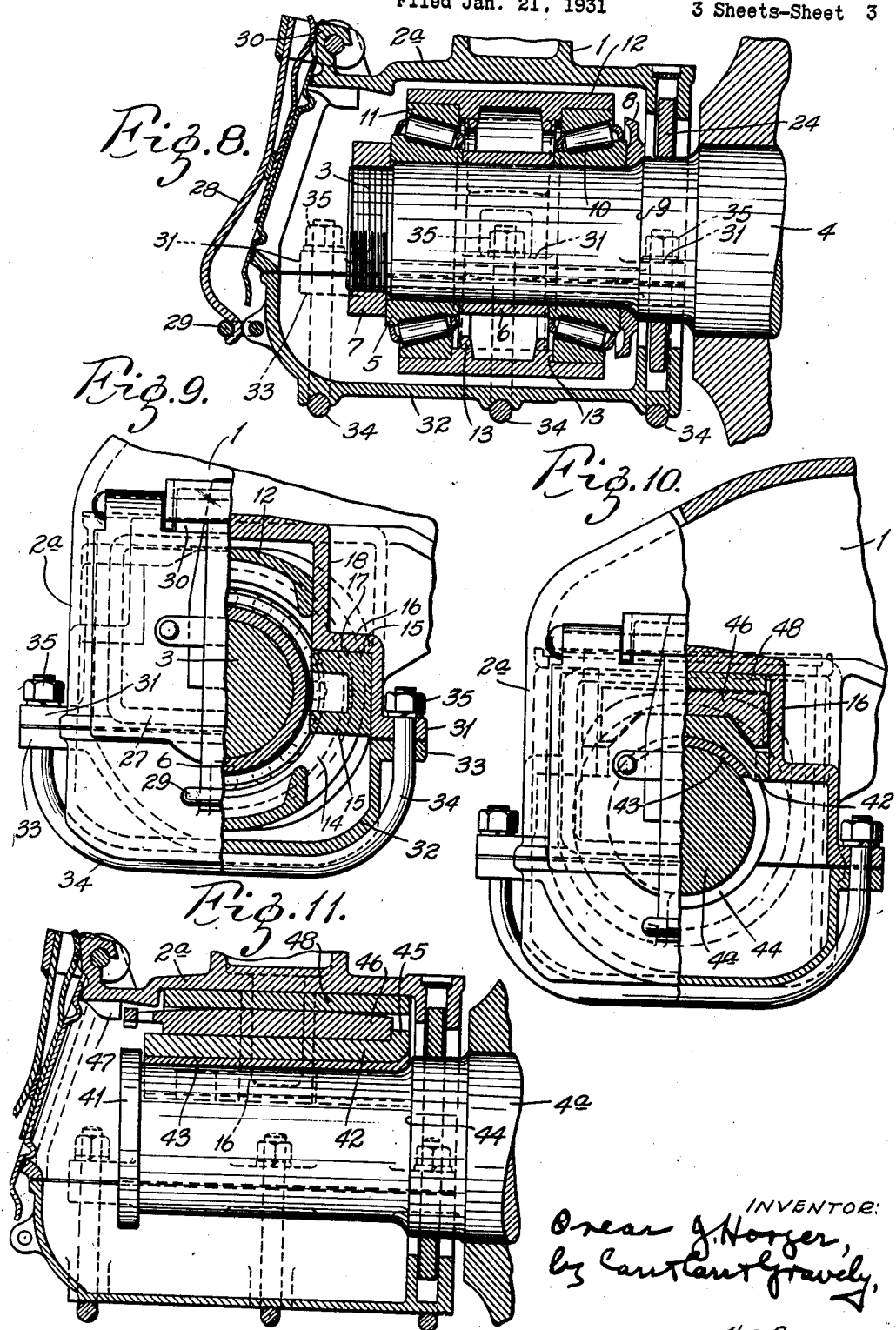

Patented Aug. 8, 1933

1,921,882

UNITED STATES PATENT OFFICE 1,921,882

RAILWAY CAR TRUCK AND JOURNAL BOX

Oscar J. Horger, Canton, Ohio, assignor to The Timken Roller Bearing Company, Canton, Ohio, a Corporation of Ohio Application January 21, 1931. Serial No. 510,155

4 Claims. (Cl. 308—180)

My invention relates to railway car truck constructions, particularly to constructions of the type in which the journal box or the upper portion is made integral with the truck side frame; and it has for its principal object to provide a roller bearing axle construction for use with such journal boxes and also to permit the substitution for such roller bearing axle constructions, of the usual plain bearing axle constructions, such as the present A. R. A. standard plain bearing axle. The invention consists principally in providing a bearing housing or carrier for the axle bearings, such carrier being provided with recesses adapted for cooperation with projections on the interior of the journal box, such journal box projections also being adapted for use with plain axle bearings. The invention further consists in the railway car axle and truck construction and in the parts and combinations and arrangements of parts hereinafter described and claimed.

Figure 4:
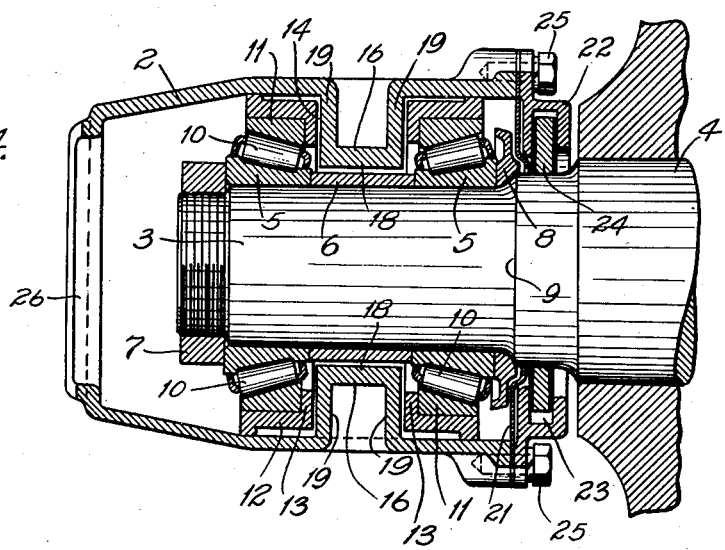
Figure 5:
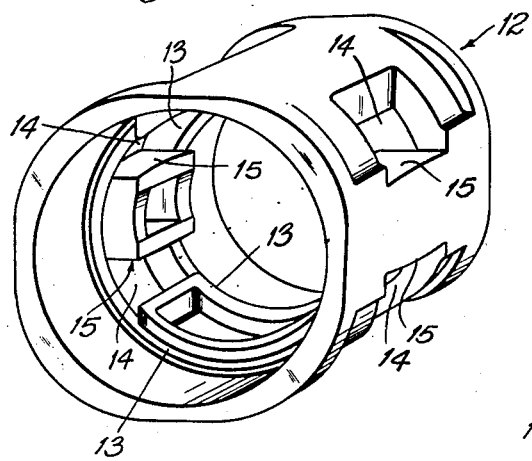
Figure 6:
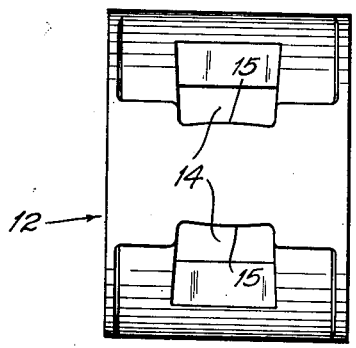
Figure 7:
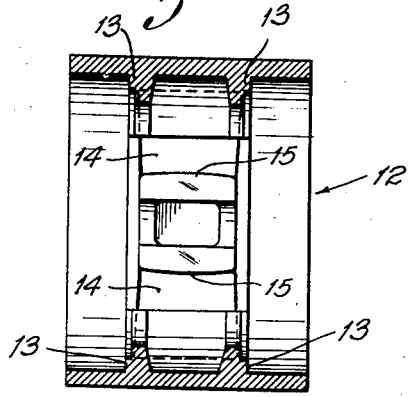

In the accompanying drawings,

Fig. 1 is a side elevation of one end portion of a car truck embodying my invention, Fig. 2 is a cross-sectional view, Fig. 3 is a vertical sectional view on the line 3—3 of Fig. 1, Fig. 4 is a horizontal sectional view, Fig. 5 is a perspective view of the bearing carrier, Fig. 6 is a side view thereof, Fig. 7 is a longitudinal sectional view thereof, Fig. 8 is a view similar to Fig. 3 showing a modification, Fig. 9 is a part elevation, part sectional view of the modification shown in Fig. 8, Fig. 10 is a view similar to Fig. 9 showing the use of plain bearings; and Fig. 11 is a view similar to Fig. 8, showing plain bearings.

In the construction illustrated in Fig. 1, a truck side frame 1 has a depending elongated journal box 2 integral with each end thereof, only one end of the side frame being shown in the drawing.

Projecting into each journal box 2 is the reduced end portion 3 of an axle 4 on which are mounted spaced cones or inner bearing members 5 of antifriction bearings, such as taper roller bearings. A spacer ring 6 is mounted between the two bearing members 5 and a nut 7 is mounted on the threaded outer end of the axle 4. At the inner end of the innermost bearing cone 5 is an oil flinger ring 8 that is mounted against a shoulder 9 on the axle 4. The bearings are thus rigidly held in position.

Mounted on each inner bearing member 5 is an annular series of suitable antifriction elements, as tapered rollers 10; and a cup 11 or outer bearing member is provided for each series of antifriction elements 10. Said bearing cups 11 are mounted in the ends of a hollow bearing housing or carrier 12, being seated against internal annular ribs 13 in said carrier.

In the sides of the carrier 12, preferably above the center line thereof, are recesses 14; and at the lower part of each recess, the carrier is provided with an inwardly projecting ledge 15 that is preferably crowned on its upper surface endwise of the carrier. The carrier 12 is preferably provided with two sets of such openings 14 and ledges 15 so as to be reversible.

The journal box 2 is provided with inwardly projecting portions 16 that extend into said recess of said carrier. The bottom faces 17 of said projections are preferably flat and the end 18 and sides 19 thereof are likewise flat. A wear plate 20 may be interposed between each ledge 15 and the cooperating journal box projection 16, as shown in Fig. 2.

The inner end of the journal box 2 is open and a dust closure plate 21 and a dust guard holder 22 provided with a channel 23 for receiving a suitable closure member 24 are secured to the inner end of the journal box as by screws 25.

The outer end of the journal box 2 is provided with an opening 26 in its upper portion and with a closure cap 27 therefor, said closure cap being secured in position by means of a clamp spring member 28 whose lower end is held by a loop 29 secured to said journal box. The top of the journal box 2 is provided at its outer end with a lug 30 of the kind commonly used for hingedly securing present standard closure caps to the journal box; so that hinged caps of the present type may be used, if desired. Said lug 30 supports the upper end of the cap shown in the drawing.

Figs. 8 and 9 show a slightly modified construction in which the upper portion 2a only of the journal box is integral with the side frame 1. The sides of said upper portion 2a are provided along their lower edges with projecting flanges 31 and a separate lower journal box member 32 having flanges 33 around its upper edge is secured to the upper box member 2a, as by U-bolts 34 extending beneath the lower member 32 and through holes in the flanges of the two journal box members, said bolts being held by means of nuts 35. Rivets or other fastening means might be used. In other particulars, the construction shown in Figs. 8 and 9 is the same as has been described.

Figs. 10 and 11 illustrate the adaptability of the construction for use with plain bearings, such as the present A. R. A. standard bearings. Instead of the roller bearing axle, a standard axle 4a with a collar 41 at its outer end extends into the journal box 2a. Mounted on the journal portion of the axle in the space between said projections 16 is a journal bearing or brass 42 that is preferably provided with a liner member 43. Said brass or journal bearing 42 is held between said collar 41 and a shoulder 44 on the axle, a certain amount of looseness being left to permit relative motion. At the inner end of said journal bearing 42 is an upstanding shoulder 45 and a wedge member 46 is mounted on said journal bearing. Movement of said wedge 46 in one direction is limited by said shoulder 45 on the journal bearing and in the other direction by a lug 47 in the top of said journal box 2a. Mounted on top of said wedge 46 and engaging the underside of the top of the journal box is a filler block or plate 48. Except for this filler block, my plain bearing members are the same as those constituting present A. R. A. standard constructions.

The above described construction has numerous advantages. The projections 16 of the journal box fit loosely in the recesses 14 of the bearing carrier 12 and the bottom ledges 15 that engage the journal box projections are crowned. Thus ample freedom of movement in any direction as between the axle and bearings and the side frame is provided. While permitting all necessary movement of the truck and axle, the construction provides uniform distribution of the load on the bearings. The bottom of the journal box will contain a supply of oil for the bearings and oil thrown off by the bearings in their rotation will be distributed to the crowned bearing ledges 15 of the carrier, thus reducing the friction and minimizing wear of said ledges 15 and the journal box projections 16. Any end thrust will likewise be distributed to all of the bearings by reason of engagement of the sides of said journal box projections 16 with the carrier 12.

Obviously numerous changes may be made without departing from the invention; and I do not wish to be limited to the precise construction shown.

What I claim is:

1. A railway car truck and journal box construction comprising a journal box provided with internal projections at each side, an axle extending into said journal box, a bearing carrier surrounding said axle, said carrier having continuous annular end portions and antifriction bearings, in said annular end portions, said carrier having recesses in its sides adapted to receive said journal box projections.

2. A railway car truck and journal box construction comprising a journal box provided with internal projections at each side, an axle extending into said journal box, a bearing carrier surrounding said axle, said carrier having continuous annular end portions and antifriction bearings in said annular end portions, said carrier having recesses in its sides adapted to receive said journal box projections, said recesses being wider than said projections.

3. A railway car truck and journal box construction comprising a journal box provided with internal projections at each side, an axle extending into said journal box, a bearing carrier surrounding said axle and antifriction bearings therebetween, said carrier having recesses in its sides adapted to receive said journal box projections, the bottom walls of said recesses on which said projections rest being crowned endwise of the carrier, the lower ends of said projections resting on said bottom walls of said recesses and the top of said bearing carrier being clear of the journal box.

4. A railway car truck and journal box construction comprising a journal box, an axle extending into said journal box, antifriction bearings on said axle, a carrier for said bearings, said carrier being recessed in each side, thereby forming a horizontal ledge in each side wall and means in said journal box seated on said ledges to transmit the weight of the car to said axle.

OSCAR J. HORGER.